US011396869B2

(12) United States Patent
Schulz

(10) Patent No.: US 11,396,869 B2
(45) Date of Patent: Jul. 26, 2022

(54) SEAT VALVE

(71) Applicant: BURCKHARDT COMPRESSION AG, Winterthur (CH)

(72) Inventor: Reiner Schulz, Lottstetten (DE)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 17/421,557

(22) PCT Filed: Jan. 8, 2020

(86) PCT No.: PCT/EP2020/050280
§ 371 (c)(1),
(2) Date: Jul. 8, 2021

(87) PCT Pub. No.: WO2020/144213
PCT Pub. Date: Jul. 16, 2020

(65) Prior Publication Data
US 2022/0099081 A1 Mar. 31, 2022

(30) Foreign Application Priority Data
Jan. 8, 2019 (EP) ..................... 19150667

(51) Int. Cl.
*F04B 39/10* (2006.01)
*F16K 15/06* (2006.01)
(Continued)

(52) U.S. Cl.
CPC ...... *F04B 39/1013* (2013.01); *F04B 39/1053* (2013.01); *F16K 15/066* (2013.01);
(Continued)

(58) Field of Classification Search
CPC .............. F04B 39/1013; F04B 39/1053; F16K 15/066; F16K 47/0111; F16K 47/0112; F16K 47/023; Y10T 137/785
See application file for complete search history.

(56) References Cited

U.S. PATENT DOCUMENTS 1,377,199 A * 5/1921 Granby ................... F16K 17/08
251/86
1,516,846 A 11/1924 Dever
(Continued)

FOREIGN PATENT DOCUMENTS

| DE | 4029909 A1 | 3/1992 |
| EP | 2549159 A1 | 1/2013 |
| WO | 09158147 A1 | 12/2009 |

OTHER PUBLICATIONS

International Search Report PCT/EP2020/050280, prepared by the European Patent Office, dated Apr. 20, 2020, 14 pages including the English Translation.

*Primary Examiner* — Mary E McManmon
*Assistant Examiner* — Frederick D Soski
(74) *Attorney, Agent, or Firm* — Brooks Kushman P.C.

(57) ABSTRACT

Seat valve, with a valve body having a plurality of inlet channels, with a plurality of closing elements arranged movably in a longitudinal direction L, each inlet channel being assigned a closing element for opening and closing the inlet channel, with a closing spring assigned to each closing element. The closing spring applies a prestressing force to the respective closing element to close the inlet channel. Each closing element assigned a braking device which is arranged separately from the closing element and which gradually brakes an opening movement of the closing element when the inlet channel is opened, independently of the closing spring. The braking device having a stop body with a stop surface against which the closing element can be
(Continued)

brought to bear after an opening movement when the inlet channel is opened, the stop body being arranged movably and/or yieldingly in the opening direction of the closing element.

14 Claims, 6 Drawing Sheets

(51) Int. Cl.
*F16K 47/00* (2006.01)
*F16K 47/02* (2006.01)

(52) U.S. Cl.
CPC ......... *F16K 47/012* (2021.08); *F16K 47/0111* (2021.08); *F16K 47/0112* (2021.08); *F16K 47/023* (2013.01); *Y10T 137/785* (2015.04)

(56) References Cited

U.S. PATENT DOCUMENTS

| | | | | |
|---|---|---|---|---|
| 2,094,951 A * | 10/1937 | Kowan | ............... | F04B 39/1013 137/538 |
| 4,228,820 A | 10/1980 | Deminski | | |
| 4,413,688 A * | 11/1983 | Seabourn | ............. | E21B 21/001 175/218 |
| 4,489,752 A | 12/1984 | Deminski | | |
| 4,638,832 A * | 1/1987 | Mokveld | ................ | F16K 1/126 137/220 |
| 4,941,503 A * | 7/1990 | Hubner, Jr. | ............. | F16K 17/04 137/541 |
| 5,050,637 A * | 9/1991 | Sagawa | ................... | F16K 17/04 137/529 |
| 5,511,583 A * | 4/1996 | Bassett | ............... | F04B 39/1033 137/512.1 |
| 6,581,632 B2 * | 6/2003 | Walpole | ................ | F16K 15/026 137/512.1 |
| 6,932,109 B2 * | 8/2005 | Thompson | ............ | F16K 17/082 137/315.27 |
| 2002/0170603 A1 * | 11/2002 | Cerovich | ............. | F16K 15/066 137/514 |
| 2006/0180208 A1 * | 8/2006 | Walpole | ................ | F16K 31/084 137/528 |
| 2006/0260693 A1 | 11/2006 | Chalk et al. | | |
| 2009/0288722 A1 * | 11/2009 | Ball | ....................... | F16K 17/04 137/614.2 |
| 2010/0025601 A1 * | 2/2010 | Francini | ............. | F04B 39/1013 251/63.6 |
| 2011/0114203 A1 * | 5/2011 | Mazzoni | ................ | F16K 17/06 137/514 |
| 2013/0019745 A1 * | 1/2013 | Bagagli | ................ | F16K 15/026 91/418 |
| 2013/0251565 A1 * | 9/2013 | Russell | ............... | F04B 39/1053 137/542 |
| 2014/0312257 A1 * | 10/2014 | Marica | ................ | F04B 39/1013 251/285 |
| 2017/0037843 A1 * | 2/2017 | Yeats | ...................... | B60T 17/02 |
| 2017/0175930 A1 * | 6/2017 | Wyatt | ................. | F16K 27/0209 |
| 2018/0298890 A1 * | 10/2018 | Schulz | .................. | F04D 17/08 |
| 2020/0370668 A1 * | 11/2020 | Fujinami | ................ | F16K 15/12 |

* cited by examiner

SEAT VALVE

CROSS-REFERENCE TO RELATED APPLICATION

This application is the U.S. national phase of PCT Application No. PCT/EP2020/050280 filed on Jan. 8, 2020, which claims priority to EP Patent Application No. 19150667.4 filed on Jan. 8, 2019, the disclosures of which are incorporated in their entirety by reference herein.

TECHNICAL FIELD

The present invention relates to a seat valve. The invention also relates to a piston compressor equipped with such a seat valve.

BACKGROUND

The publications U.S. Pat. No. 4,489,752 and EP2549159A1 disclose a seat valve, also referred to as a poppet valve, which is used for a compressor. In such a seat valve, the respective closing element is moved back and forth between an open and a closed position due to the applied pressure of the fluid to be conveyed. During opening movements of the closing element, there is a risk that it will strike against a surface limiting the opening travel on a side facing away from the respective valve seat. This can lead to undesirable wear or damage that impairs safe operation of the valve. EP2549159A1 also discloses a damper made of elastic material to reduce the force acting on the closing element.

SUMMARY

Against this background, it was the object of the present invention to provide a seat valve that can be operated with a higher degree of operational reliability or improved durability. The object was also to provide a piston compressor.

With respect to the seat valve, this object has been solved by the subject matter of claim 1. A closing device according to the invention is given in claim 18. Advantageous embodiments are provided in the dependent claims and are discussed below.

A seat valve according to the invention is designed in particular for use in a piston compressor. A seat valve according to the invention is preferably a so-called poppet valve.

A seat valve according to the invention comprises a valve body having a plurality of inlet channels, and comprises a plurality of closing elements arranged movably in a longitudinal direction, each inlet channel being assigned a closing element for opening and closing the inlet channel, with a closing spring assigned to each closing element, which acts on the respective closing element with a prestressing force oriented towards closing of the inlet channel, each closing element being assigned a braking device which is arranged separately from the closing element and which gradually brakes an opening movement of the respective closing element when the inlet channel is opened, independently of the closing spring. The braking device has a stop body with a stop surface against which the closing element can be brought into contact after an opening movement when the inlet channel is opened, the stop body being arranged so as to be movable and/or yieldable in the opening direction of the closing element. The braking device is guided along the longitudinal direction by a guide device so that the stop body is arranged movably in the longitudinal direction, the guide device having a sleeve-shaped section and the braking device being arranged at least in sections within a recess of the sleeve-shaped section. The guide device forms an inner guide for the closing element, along which the closing element is guided movably in the longitudinal direction.

The closing element can therefore be prestressed by the closing spring in the direction of a closing position that closes the inlet channel, so that the prestressing force of the closing spring increases when the inlet channel is opened due to an opening movement of the closing element. After the opening process, the closing element and thus the inlet channel can thus close again automatically.

Irrespective of the increase in the prestressing force of the closing spring in the direction of a closed position when the inlet channel is opened, the braking device enables gradual braking of the closing element when the inlet channel is opened. According to the invention, the braking of the closing element by the braking device takes place gradually, in particular free of abrupt movement limitations of the closing element. From a state of movement, the closing element is thus braked slowly or preferably continuously by the braking device, whereby damage or excessive wear to the closing element or to stop components for the closing element can be avoided.

According to the invention, the braking device is arranged separately or independently of the closing element. The closing element can thus be arranged without direct connection to the braking device, so that the mass of the closing element can be kept low and thus a favorable response behavior of the seat valve is basically ensured. In particular, because the closing element is arranged separately from the braking device, it can also be moved independently of the braking direction, at least along a certain range of movement.

In a seat valve according to the invention, the valve body can advantageously be formed with a valve seat and the inlet channel can open into the valve seat. In this case, the closing element for closing the inlet channel can come into contact with the valve seat and close the valve seat in a sealing manner. To open the inlet channel, the closing element can move in a direction away from the valve seat and thus lift off from the valve seat.

The closing element can be arranged to be movable in an axial direction for opening and closing the inlet channel. The axial direction is preferably a longitudinal axis of the inlet channel and/or a longitudinal axis of the closing element and/or a longitudinal axis of the braking device.

A seat valve comprises a plurality of inlet channels and a plurality of closing elements, wherein one closing element each may be associated with an inlet channel. A single seat valve can accordingly be equipped with a plurality of closing valves, each closing valve being formed by at least one inlet channel and a closing element associated with the inlet channel.

According to a preferred embodiment, the braking device has a motion damper and/or a catch spring. A motion damper or a catch spring can be used to achieve gradual braking of the closing element in a particularly advantageous manner and with a reduced risk of material wear. In this case, the kinetic energy of the closing device can be advantageously absorbed by arranging a motion damper, and if a catch spring is arranged, the respective catch spring can be charged by braking the closing element and discharged again by relaxing it. In this case, the relaxation can promote any return movement of the closing element into a closing position that closes the inlet channel.

The braking device is preferably guided along the longitudinal direction by a guide means, so that the stop body is arranged to be movable in the longitudinal direction.

The braking device can preferably be designed as a spring stop and/or spring buffer and/or stop buffer. Such designs are cost-effective and ensure a high degree of operational safety.

The braking device can have damping as well as springing properties, and separate components can be provided for this purpose. It is also possible for the damping and/or spring functions to be provided by a single component, for example a component made of rubber material, which has both spring-elastic and damping properties when deformed.

According to a further advantageous embodiment of the present invention, the closing element, starting from a position closing the inlet channel, is free from braking effects of the braking device in an opening direction along a minimum distance. Furthermore, starting from a position closing the inlet channel, the closing element may be movable in an opening direction along a minimum distance relative to the braking device. The closing element can therefore be moved from a closed position to an open position with only a small amount of force before the braking action of the braking device sets in and contributes to the gradual braking of the closing element. This means that the closing element can be opened automatically even at low gas pressures, but without the risk of excessive material wear due to abrupt stops or braking processes at stationary stops.

Accordingly, the braking device can be set up to gradually brake the closing element only after a minimum distance has been covered, starting from a position closing the inlet port. The minimum distance can be selected so that the inlet channel is sufficiently open when the braking effect begins, or the closing element is sufficiently spaced from the valve seat, and at the same time sufficient braking distance is available for gradual braking of the closing element in the opening direction. In this way, safe functionality of the seat valve is ensured on the one hand and the risk of abrupt braking or firm impact of the closing element on a fixed stop surface is avoided on the other.

The closing element is movably guided along an axial direction by a guide means, whereby incorrect positions of the closing element or one-sided loads on the valve seat can be avoided. The closing element has a guide interior in which the guide means for axial guidance of the closing element runs and in which at least one component and/or a section of the braking device is arranged. This results in a particularly space-saving arrangement with a simultaneous high degree of guiding safety or braking safety by the braking device.

According to a further advantageous embodiment, the closing element can comprise a closing head and a guide section, the closing head and the guide section preferably following one after the other along an axial direction and/or the closing device having, starting from the guide section, a guide interior extending in the axial direction into the interior of the closing element in the direction of the closing head. The subdivision into a closing head and a guide section means that, on the one hand, the closing head can be designed with regard to particularly favorable closing properties and wear resistance and, on the other hand, the guide section can advantageously ensure reliable guide functionality.

Further preferably, the guide means can be formed at least in sections by the braking device. The braking device can also be coupled to the guide means. The braking device can thus provide a guide functionality or be anchored to the guide means. The range of movement or deformation of the braking device can accordingly be predefined by the guide means or by the engagement and/or coupling with the guide means.

Further preferably, the braking device can be movable at least in sections relative to the guide means, in particular for braking the closing element. In this way, it is possible to arrange the guide means or part of the guide means in a fixed position and to effect a gradual braking effect on the closing element by the movable arrangement of the braking device or a section of the braking device. In particular, the guide means can suitably guide the closing element during an opening movement and the movably arranged braking device can absorb the opening movement or absorb it in a braking manner. In other words, the braking device can be moved relative to the guide means by the opening movement of the closing element.

According to a further preferred embodiment, at least one section and/or one component of the braking device for braking the closing element can be elastically deformable, in particular linearly elastically deformable. A linear-elastic deformability can be provided, for example, in coil springs, which can be made of a metallic material or also of a plastic. Similarly, linear or linear-elastic deformability may be provided by a component made of rubber material, for example, an elastomeric material. A component and/or section with elastically or linearly elastically deformable properties can provide a safe braking effect for gradual braking of the closing element with only minimal design effort, with the linearly elastic deformability in particular providing suitable restoring forces for assuming the original undeformed state. This results in particularly good suitability for continuous operation of a seat valve according to the invention.

According to a further advantageous embodiment, the braking device is arranged at least in sections within a recess of the guide means and/or surrounded by the guide means. The braking device can accordingly be enclosed in sections by the guide means, whereby the operating position of the braking device can be predefined. Furthermore, by arranging the braking device within a recess or by surrounding the braking device by the guide means, any deformation behavior of the braking device, in particular of a component or a section of the braking device, can be influenced in a desired manner. In particular, it is possible to allow any deformations primarily or exclusively along an axial direction and to limit or completely prevent deformations transverse to the axial direction by shaping the guide means.

The guide means has a sleeve-shaped section. A sleeve-shaped section can further have circumferential steps so that the outer circumference of the guide means can have a different dimension at different points along an axial direction. For example, the guide means can have a larger outer circumference in an entry region of the guide interior than in a region of the guide interior adjacent to the closing head. The closing head or the region of the guide section adjacent to the closing head can thus be designed to be particularly stable, which can improve the wear resistance of the closing element.

According to a further preferred embodiment, the guide means can be arranged at least in sections within a recess of the braking device and/or surrounded by the braking device. In such an embodiment, the braking device can also be used in an advantageous manner to guide the closing element. In this case, the guide means can directly guide the braking device and indirectly provide a guide functionality for the closing element via the braking device.

According to a further preferred embodiment, the guide means can be fastened and/or supported on a catcher, in particular spring-loaded and/or damped and/or spring-elastically supported by means of a wave spring, coil spring and/or by means of a damping plate. Likewise, the braking device can be spring-elastically supported on the guide means. Such a catcher can be fixed relative to the valve body or positioned at a fixed predetermined distance. Thus, by fixing and/or supporting the guide means to the catcher, the position of the guide means relative to the valve body can be suitably defined and thus also ensure a suitable guide functionality for moving the closing element. By means of a resilient and/or damping support or attachment to the catcher, the guide means can favor the braking behavior of the closing element in a further advantageous manner or further reduce the risk of abrupt or sudden movement limitations of the closing element.

The closing element can be moved in the opening direction from a position closing the inlet channel and can also come into contact with a stop surface of the stop body after a minimum distance has been covered. During further opening movement of the closing element, the stop body or the stop surface moves together with the closing element, so that abrupt braking of the closing element can be prevented. When it comes into contact with the stop surface, the closing element is thus decelerated, but the movable or yieldable arrangement of the stop body and/or the stop surface only gradually leads to a complete or punctual deceleration of the closing element.

According to a further embodiment, the stop body is supported relative to the guide means and relative to the catcher by means of a catch spring, which can be designed in particular as a coil spring. Coil springs allow a relatively long braking distance and thus a relatively slow increase in deceleration, which is particularly gentle on the material.

It is also possible that the stop body is made of an elastic material and/or has an elastic portion for elastic support of the stop surface. In this case, the elastic portion can, for example, be formed by at least one material recess and/or material interruption. In this way, a braking functionality can be provided without a separate spring element, resulting in an overall robust and cost-effective structure.

According to a further preferred embodiment, the stop body is form-fittingly supported and/or held on the guide means in a closing direction of the closing element. Furthermore, a movement of the stop body and/or the stop surface in a closing direction or in a closing orientation of the closing element can be limited by form-fitting engagement with the guide means. Accordingly, the stop body or the stop surface can have a defined compliance due to the support on the guide means during the gradual deceleration of the closing element in the case of an opening movement. At the same time, the limitation of movement of the stop body or stop surface in a closing direction or closing orientation of the closing element allows the closing element to disengage from the stop body or stop surface again before reaching the position closing the inlet channel. Accordingly, a minimum distance can be maintained between the stop body or the stop surface in a position of the closing element that closes the inlet channel.

In a further preferred manner, a snap ring is arranged between the stop body and the guide means. Likewise, a protrusion can be formed on an outer circumference of the stop body, which engages in a recess of the guide means and/or engages behind a collar section of the guide means. It is likewise possible for a recess to be formed on an outer circumference of the stop body into which a protrusion of the guide means engages, in particular a protrusion formed on the inner circumference of the guide means.

Finally, according to a preferred embodiment, a collar portion may be formed on an inner circumference of the stop body to engage behind a head portion of the guide means. Furthermore, a collar section can be formed on an outer circumference of the guide means, which engages behind the stop body.

Such designs can advantageously define or limit the relative mobility between the stop body and the guide means. For example, the snap ring can be arranged within an inner circumferential groove of the guide means and thereby fixed in a predetermined position. At the same time, the snap ring can engage in an outer circumferential groove of the stop body, which, however, has a larger extension along an axial direction than the inner circumferential groove of the guide means. The snap ring thus enables the stop body to move until the end position of the respective outer circumferential groove of the stop body is reached.

According to a further embodiment of the seat valve, the stop body can be sleeve-shaped and/or have a circumferential step and/or a circumferential support collar. Preferably, the stop surface is formed on the step or the support collar and/or the stop body is supported on a catch spring via the support collar. Such a sleeve-shaped stop body can be manufactured particularly inexpensively and positioned securely within a guide interior of the closing element. The guidance of a sleeve-shaped stop body within the guide interior can be accomplished safely and thus ensures a high degree of functionality of the seat valve. Supporting the stop body via the support collar on a catch spring results in favorable force distribution and direct contact of the catch spring by the closing element can be avoided, which has a favorable effect on low surface pressures.

According to a further advantageous embodiment, a catch spring of the braking device is arranged in a receptacle of the guide means, in particular on an annular circumferential receptacle. A catch spring of the braking device can be mounted on a damping element. Accordingly, the damping element can likewise be arranged in an annularly rotating receptacle of the guide means, preferably on a side of the catch spring facing away from the closing element in the axial direction. Furthermore, a catch spring can be arranged axially adjacent to the closing element and/or completely outside the guide interior of the closing element. The catch spring can thus be formed independently of the dimensions of the guide interior, in particular with a diameter that is larger than a diameter of the guide interior. This results in a relatively high stability of the catch spring. However, it is also possible for the catch spring to be arranged at least in sections within the guide interior of the closing element, which can be implemented in a particularly space-saving manner and at the same time allows the catch spring to be guided during deformation for braking the closing element.

According to a further embodiment of the seat valve, the guide means and/or the braking device, in particular the stop body, may have an air passage, preferably for ventilating and/or exhausting the guide interior during opening and/or closing movements of the closing element. Likewise, an air passage may be provided through the catcher. Such an arrangement of an air passage allows opening and closing movements to be accomplished with little or no interference from pressure changes in the guide interior of the closing element. Neither excessive overpressure nor insufficient underpressure will impair the desired movement of the closing element.

It can also be advantageous if an air passage of the stop body can be closed and/or opened by contact of the closing element and/or by relative movement between stop body and guide means. By closing or opening an air passage in this way, it is possible to exert a targeted influence on the prevailing pressure conditions in the guide interior of the closing element, so that the movement of the closing element can be influenced in a desired manner.

A further aspect of the present invention relates to a seat valve, in particular upstream of a piston compressor, with a valve body having an inlet channel, with a closing element movably arranged for opening or closing the inlet channel, with a closing spring which applies to the closing element a biasing force oriented towards the closing of the inlet channel, and with a braking device which has a movement damper arranged for damping an opening movement of the closing element when the inlet channel is opened. The above explanations regarding the seat valve according to the invention also apply accordingly to the seat valve according to the further aspect of the invention.

Finally, the invention also relates to a piston compressor with a seat valve described above.

The above explanations regarding the possible designs or different aspects of a seat valve according to the invention also apply accordingly to a piston compressor according to the invention.

BRIEF DESCRIPTION OF THE DRAWINGS

The present invention is explained in more detail below with reference to advantageous embodiments and the accompanying drawings.

It show.

Generally, the same parts are given the same reference signs in the drawings.

DETAILED DESCRIPTION

Figure 1:
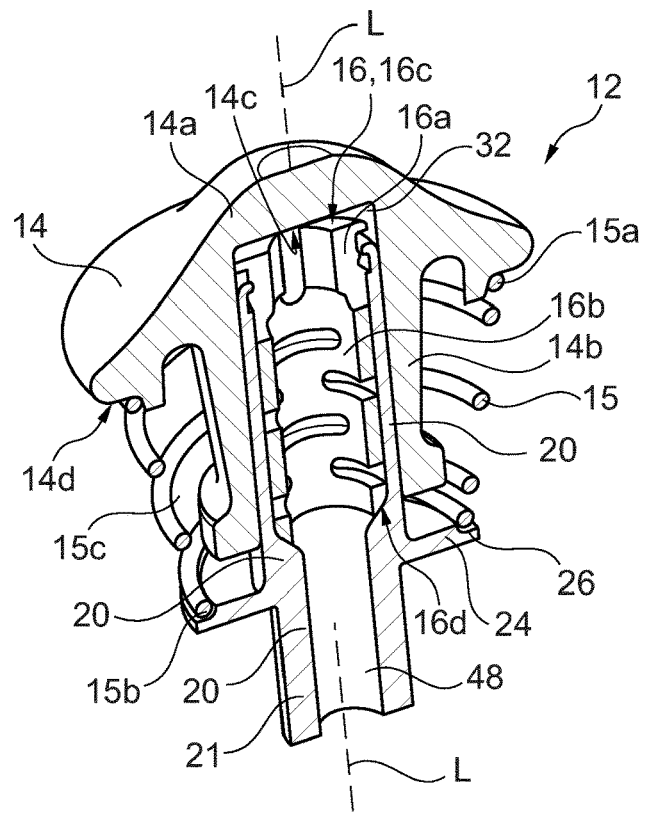
FIG. 1 a perspective longitudinal section of a first embodiment of a closing device of the seat valve according to the invention.
Figure 2:
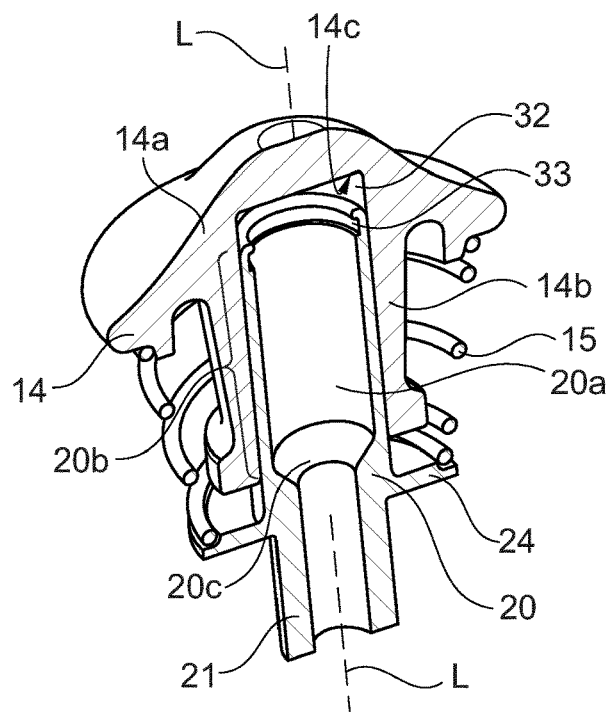
FIG. 2 the closing device shown in FIG. 1 without braking device.
Figure 3:
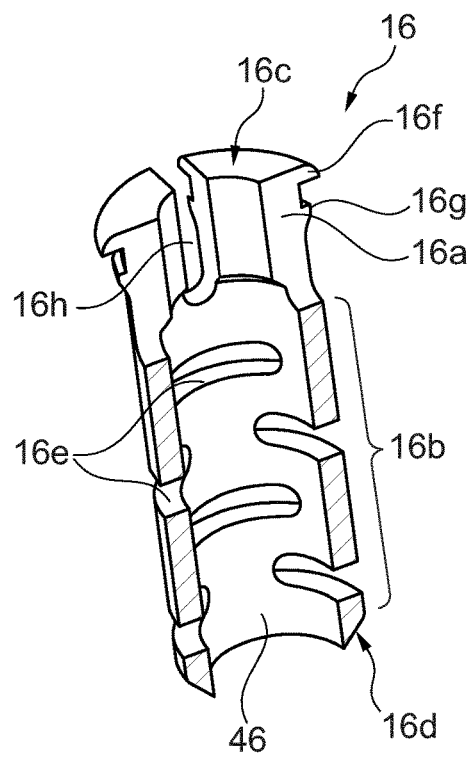
FIG. 3 the braking device of the closing device according to FIG. 1.
Figure 4:
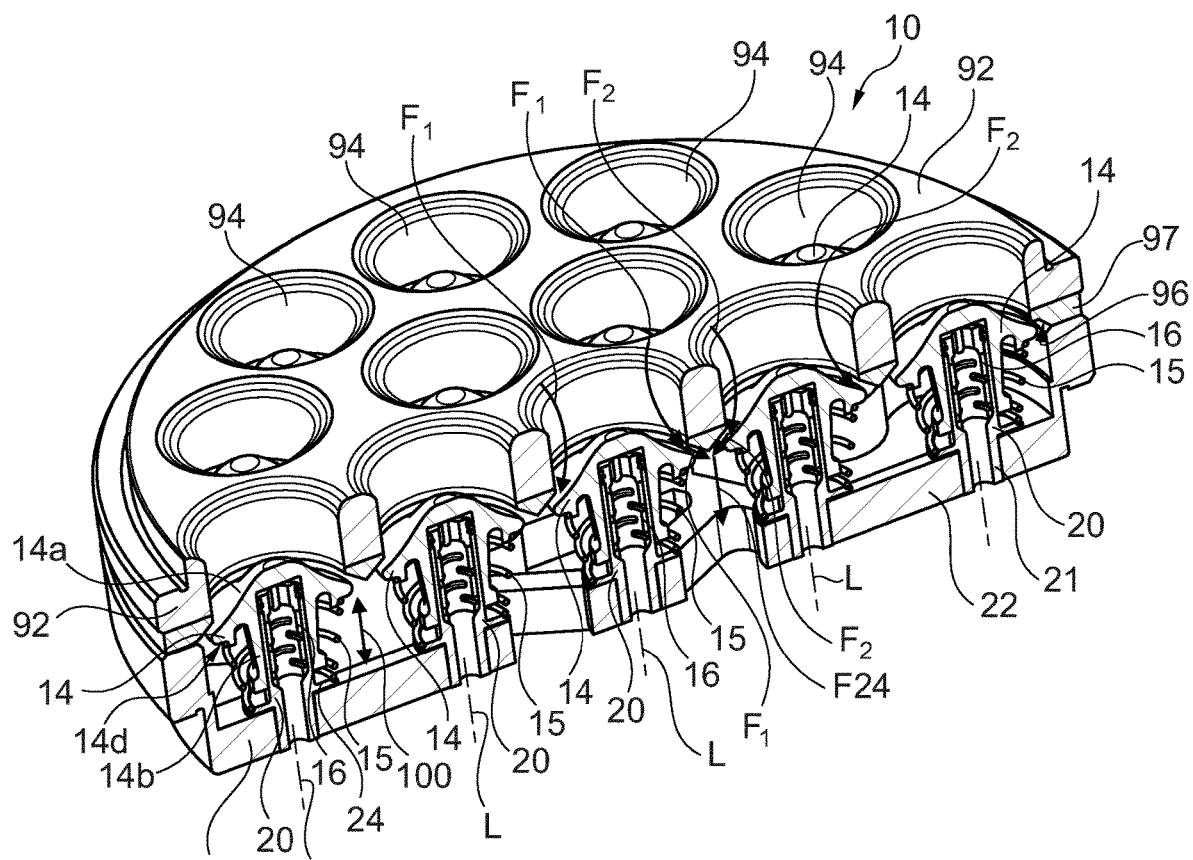
FIG. 4 a perspective sectional view of a seat valve according to the invention.

FIG. 4 shows a perspective sectional view of an embodiment of a seat valve 10 according to the invention. FIG. 1 shows a perspective longitudinal sectional view of a first embodiment of a closing device 12, which is suitable, for example, for the seat valve 10 shown in FIG. 4. Such a seat valve is designed in particular for use in piston compressors. The seat valve 10 comprises a valve body not shown in FIG. 1 with a plurality of inlet channels, and comprises a plurality of closing devices 12. FIG. 2 shows the closing device shown in FIG. 1 without the braking device 16. FIG. 3 shows the braking device 16 of the closing device 12 according to FIG. 1.

The closing device 12 has a closing element 14, which is arranged movably in a longitudinal direction L for opening and closing an inlet channel, and a closing spring 15, the closing spring 15 acting on the closing element 14 with a prestressing force oriented towards closing the inlet channel. Furthermore, the closing device 12 has a braking device 16, which is arranged separately or independently of the closing element 14, and which gradually brakes an opening movement of the closing element 14 when the inlet channel is opened, independently of the closing spring 15, as soon as the closing element 14 comes into contact with the braking device 16. Due to the separate or independent arrangement of the closing element 14 from the braking device 16, there is no direct connection between the closing element 14 and the braking device 16.

In the position according to FIG. 1, the closing element 14 is in a position spaced from the braking device 16, so that the closing element 14 can be arranged in contact with a valve seat of a valve body not shown here. From this position, the closing element 14 can be moved away from the valve seat of the valve body to open the inlet channel or to lift off the valve seat of the valve body, and thus towards the braking device 16. Accordingly, the closing element 14 can be moved relative to the braking device 16 in an axial direction along the longitudinal axis L. Accordingly, an opening movement occurs along a downward orientation in FIG. 1.

A guide means 20 is also provided for movably guiding the closing element 14. The guide means 20 can be supported or fastened to a catcher 22 shown, for example, in FIG. 4. The catcher 22 can be fixedly positioned relative to a valve body not shown here or arranged at a fixedly predetermined distance. To support the guide means 20 on the catcher 22, the guide means 20 may have a support section 24. The support section 24 may be a collar-like protrusion that limits an insertion depth of a mounting section 21 of the guide means 20 in the catcher 22. A bearing seat 26 may be provided on the support section 24 for supporting the closing spring 15. The closing spring 15 can thus act between the closing element 14 and the bearing seat 26.

The closing element 14 has a closing head 14a and a guide section 14b, the closing head 14a and the guide section 14b following one after the other along an axial direction L, the closing element 14 preferably consisting of one piece. The closing element 14 further has, starting from the guide section 14b, a guide interior space 32 extending in the axial direction L into the interior of the closing element 14 toward the closing head 14a. The guide interior space 32 serves to receive the guide means 20 or the braking device 16. At least one component or section of the braking device 16 and/or the guide means 20 can be received in the guide interior space 32.

In the embodiment according to FIG. 1, the braking device 16 comprises a stop body 16a and a spring-elastic portion 16b, wherein the spring-elastic portion 16b has a bearing surface 16d which rests on a bearing surface 20c of the guide means 20, so that the stop body 16a is spring-elastically supported along the axial direction L. A stop surface 16c is formed on the stop body 16a, against which the closing element 14 can come into contact during an opening movement for opening an inlet channel. In particular, the closing element 14 can come into contact with the stop surface 16c via an end surface 14c of the guide interior 32. The stop body 16a or the stop surface 16c formed on the stop body 16a are arranged to be movable or yieldable along the axial direction L, in particular due to the section 16b having spring-elastic properties.

It can also be seen from FIG. 1 that the braking device 16 is guided along the longitudinal direction L by the guide means 20, so that the stop body 16a is arranged to be movable in the longitudinal direction L. The braking device 16 is arranged to be movable in sections in the longitudinal direction L, in that the braking unit 16 has a bearing surface 16d which rests on a bearing surface 20c of the guide means 20, so that the braking device 16 is not arranged to be movable in the longitudinal direction L at this end section. The braking device 16 has an elastic portion 16b and is thus designed to be yieldable along the elastic portion 16b in the longitudinal direction L. The braking device 16 is thus designed to be yieldable along the elastic portion 16b in the longitudinal direction L. The stop body 16a is thus arranged to be movable along the axial direction L and supported resiliently with respect to the support surface 20c via the elastic portion 16b and the support surface 16d.

It can also be seen from FIG. 1 that the elastic portion 16b and a section of the stop body 16a are at least partially arranged or accommodated within the guide means 20. A support surface 20c can be provided within the guide means 20, on which the elastic portion 16b is supported.

Furthermore, the guide means 20 has an inner circumferential recess 33. In addition, the stop body 16a has a protruding collar 16f and a protruding nose 16g.

These elements 33, 16f and 16g interlock in such a way that the movements of the stop body 16a, in particular in the direction of the closing element 14, are limited. Accordingly, in the initial position shown in FIG. 1, a minimum distance can be maintained between the stop surface 16c and the oppositely arranged end surface 14c of the closing element 14c. During an opening movement of the closing element 14, there is thus initially no braking effect until the closing element 14 comes to rest against the stop surface 16c of the stop body 16a via its end surface 14c of the guide interior 32. Upon further opening movement, the stop body 16a is then moved together with the closing element 14 in an opening direction along the axial direction L to cause compression of the elastic portion 16b in the process. As a result of the compression of the elastic portion 16b, a gradual braking of the closing element 14 takes place. In particular, after the end surface 14c has come into contact with the stop surface 16c, abrupt braking or abrupt striking of the closing element 14 against a fixed stop and wear on the components in question here, in particular on the closing element 14, can be avoided by compressing the elastic portion 16b.

After reaching an end position in the opening direction of the closing element 14, the latter is moved again in the closing direction—in FIG. 1 directed upwards. This movement in the closing direction is supported by the closing spring 15 and also by the relaxation of the elastic portion 16b, whereby the movement in the closing direction of the closing element 14 can only be supported by relaxation of the elastic portion 16b over a limited distance, in particular until the upper end position of the stop body 16a is reached, as shown in FIG. 1.

The stop body 16a may be made of a metal material or may be made of a plastic material. In the case of a plastic material, the stop body 16a may have damping properties. In particular, the stop body can be made of an elastomer material or the like and thereby suitably dampen opening movements of the closing element 14 and thereby enable gradual braking in a particularly preferred manner with low wear.

As can be further seen from FIGS. 1 and 3, the stop body 16a is provided with an air passage 46 and the guide means 20 is also provided with an air passage 48. The air passages of the individual components may be in fluid communication with each other. In this regard, the air passage 48 of the guide means may pass through the catcher 22. Due to the arrangement of the air passages, ventilation and/or venting of the interior of the guide means 20 and the brake device 16 can be ensured during opening and/or closing movements of the closing element 14.

FIG. 4 shows a perspective sectional view of a seat valve 10 comprising the closing device 12 shown in FIG. 1. The seat valve 10 according to FIG. 4 is equipped with a valve body 92, in which a plurality of inlet channels 94 are formed, and with a plurality of closing elements 14, each closing element 14 being associated with one of the inlet channels 94. The closure elements 14 are shown in an open condition.

The seat valve 10 shown in FIG. 4 thus has a plurality of closing valves, wherein each closing valve can be formed by at least one inlet channel 94 and a respective associated closing element 14. Preferably, as shown in FIG. 4, a braking device 16 is provided for each closing element 14. The respective braking device 16 may, for example, be formed with the embodiment shown in FIGS. 1 to 3 or with according to one of the embodiments shown in FIGS. 5 to 11. Accordingly, each of the closing valves in FIG. 4 may be formed according to the embodiments shown in FIGS. 1 to 3 and 5 to 11 for seat valves 10.

As can further be seen from FIG. 4, each inlet channel 94 opens into a valve seat 96, wherein each valve seat 96 can be closed by a closing element 14. Each of the closing elements 14 is thus associated with a valve seat 96, wherein the closing elements 14 are each arranged opposite the associated valve seat 96 in the axial direction L, and wherein the closing elements 14 are displaceable in the axial direction L in such a way that the valve seat 96 and thus the respective inlet channel 94 can be opened or closed.

Furthermore, the seat valve 10 according to FIG. 4 has a catcher 22 as well as guide meanss 20 for the closing elements 14, which run in the axial direction L and are attached to the catcher 22. Furthermore, closing springs 15 are provided to effect a prestressing force on the closing elements 14 directed toward the valve seat 96 or toward the valve body 92. The closing elements 14 are also referred to as poppet or valve cone.

According to FIG. 4, the catcher 22 comprises a holding structure 23, which preferably runs perpendicular to the axial direction L, the guide meanss 20 running in the axial direction L being arranged on the holding structure 23, on which guide meanss the closing elements 14 are arranged so as to be movable or linearly movable in the axial direction L and are preferably mounted so as to slide. In the embodiment example shown, the guide meanss 20 are of hollow-cylindrical design, but can also be designed in accordance with the embodiment examples shown in FIGS. 1 to 3 and 5 to 11.

In the illustrated embodiment example according to FIG. 4, the closing elements 14 comprise a closing head 14a and a guide section 14b, wherein the closing element 14 is of concentric design and has a bore along the axis of symmetry, which forms a plain bearing with the guide means 20, so that the guide means 20 forms an inner guide with respect to the closing element 14. The bore can thus form a guide interior 32.

The closing head 14a further comprises a support 14d, which is advantageously of flat design. The closing spring 15 comprises a first spring end 15a and a second spring end 15b, wherein the first spring end 15a bears against the support 14d and the second spring end 15b bears against the support section 24 in order to effect a prestressing force on the closing element 14 acting towards the valve seat 96. The closing spring 15 has an interior 15c. The closing spring 15 encloses the guide means 20 as well as the closing element 14 in the axial direction L along a partial section 100 from the outside, so that both the guide means 20 and the closing element 14 are arranged along this partial section 100 within the interior space 15c of the closing spring 15. The closing spring 15 has an increasing diameter in the axial direction L towards the valve seat 96, the closing spring 15 widening conically in a preferred embodiment. Advantageously, the closing spring 15 is designed in such a way that it contacts the closing element 14 only at the support 14d. The widening closing spring 15 has the advantage that the second spring end 15b has a smaller diameter or a smaller contact surface than the first spring end 15a, which results in a larger component-free intermediate space in the area of the catcher 22 through which fluid F can flow. FIG. 4 shows an example of the fluid flows F1, F2 of two valves arranged next to each other.

The fluid flows F1, F2 are deflected by the end face of the closing element 14 transversely to the axial direction L, so that the fluid flows F1, F2 flow towards the catcher 22, for example as shown. The intersecting fluid flows F1, F2 flow in particular around parts of the adjacent closing element 14 or its closing spring 15. In order not to obstruct these fluid flows F1, F2 as far as possible, the component-free intermediate space, in particular the component-free intermediate space widening towards the catcher 22, is advantageous. The closing elements 14 tapering towards the catcher 22 are particularly advantageous. The arrangement of the closing springs 15 is also particularly advantageous because they have only a slight, preferably negligible, influence on the fluid flow F1, F2.

According to a further advantageous embodiment of the seat valve in FIG. 4, a seat plate 97 is provided, which is arranged in such a way that the closing head 14a of a closing element 14 abuts against it and thereby closes the respective inlet channel 94. The valve seat 96 is accordingly formed in the seat plate 97 or by a part of the seat plate 97. Due to the valve seat 96 or the acting closing head 14a, the seat plate 97 is a wearing part and can advantageously be replaced in a simple manner. In another possible embodiment, the seat plate 97 can be dispensed with so that the closing head 14a abuts directly against the valve body 92 and the valve seat 96 is part of the valve body 92.

In a further embodiment, the seat valve 10 can also be designed in such a way that it comprises only a single inlet channel 94 and a single closing element 14 with closing spring 15. All details described in FIG. 4 can thus be transferred to the embodiments according to FIGS. 1 to 3 and 5 to 11 or combined with the embodiments described in this respect.

Figure 5:
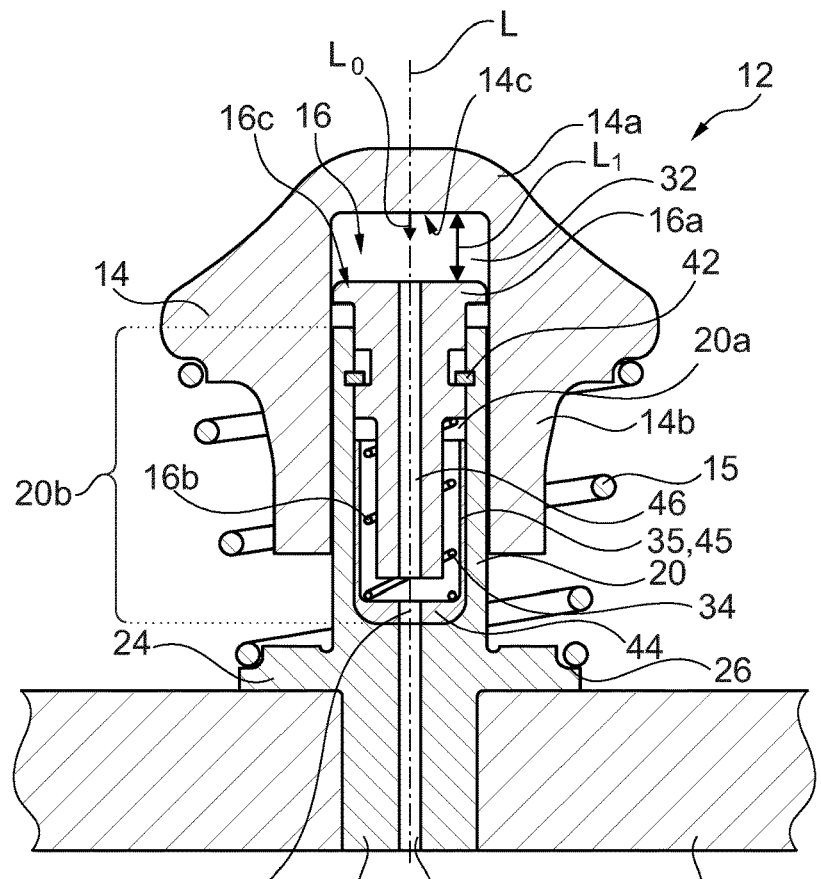
FIG. 5 a longitudinal section of a further embodiment of a closing element.

FIG. 5 shows a longitudinal sectional view of a further closing device 12 according to the invention. The closing device 12 has a closing element 14 movably arranged for opening and closing an inlet channel and a closing spring 15 which applies a prestressing force to the closing element 14 oriented towards the closing of the inlet channel. Furthermore, the closing device 12 has a braking device 16, which is arranged separately or independently of the closing element 14 and which gradually brakes an opening movement of the closing element 14 in the opening direction L0 when the inlet channel is opened, independently of the closing spring 15. Due to the separate or independent arrangement of the closing element 14 from the braking device 16, there is no direct connection between the closing element 14 and the braking device 16.

In the position according to FIG. 5, the closing element 14 is in a position spaced from the braking device 16, preferably in a position S1 closing the inlet channel, so that the closing element 14 can be arranged in contact with a valve seat of a valve body not shown here. From this position, the closing element 14 can be moved away from the valve seat of the valve body to open the inlet channel or to lift it off and thus towards the braking device 16. Accordingly, the closing element 14 can be moved relative to the braking device 16 in an axial direction along a longitudinal axis L by a minimum distance L1 before the end surface 14c contacts the stop surface 16c. Accordingly, an opening movement occurs along a downward orientation in FIG. 5.

A guide means 20 is further provided for movably guiding the closing element 14. The guide means 20 may have a sleeve-shaped section 20b, wherein the braking device 16 is arranged at least in sections within a recess 20a of the sleeve-shaped section 20b. The guide means 20 may be supported on or secured to a catcher 22. The catcher 22 may be fixedly positioned relative to a valve body not shown here, or may be arranged at a fixedly predetermined distance. To support the guide means 20 on the catcher 22, the guide means 20 can have a support section 24. The support section 24 may be a collar-like protrusion that limits an insertion depth of the guide means 20 in the catcher 22. A bearing seat 26 may be provided on the support section 24 for supporting the closing spring 15. The closing spring 15 can thus act between the closing element 14 and the bearing 26.

The closing element 14 has a closing head 14a and a guide section 14b, the closing head 14a and the guide section 14b following one after the other along an axial direction L. The closing element 14 further has, starting from the guide section 14b, a guide interior space 32 extending in the axial direction L into the interior of the closing element 14 toward the closing head 14a. The guide interior space 32 serves to receive the guide means 20 or the braking device 16. At least one component or section of the braking device 16 and/or the guide means 20 can be received in the guide interior space 32.

In the embodiment according to FIG. 5, the braking device 16 has a catch spring 34 that resiliently supports a stop body 16a along an axial direction L. The stop body 16a has a stop surface 16c. A stop surface 16c is formed on the stop body 16a, against which the closing element 14 can come into contact during an opening movement for opening an inlet channel. In particular, the closing element 14 can come into contact with the stop surface 16c via an end surface 14c of the guide interior 32. The stop body 16a or the stop surface 16c formed on the stop body 16a are arranged to be movable or compliant along the axial direction L, in particular due to the spring-elastic support by the catch spring 34. The catch spring 34 can be designed in particular as a spiral spring or the like.

It can also be seen from FIG. 5 that the catch spring 34 and a section of the stop body 16a are arranged or accommodated within the guide means 20. A spring receptacle 35 can be provided within the guide means 20, in which the catch spring 34 and also a section of the stop body 16a are received. The spring receptacle 35 can be pot-shaped and designed as a separate component from the guide means 20. The catch spring 34 and the stop body 16a are guided within the guide means 20 and/or within the spring receptacle 35 along an axial direction L.

Furthermore, a snap ring 42 is arranged between the guide means 20 and the stop body 16a, by means of which movements of the stop body 16a, in particular in the direction of the closing element 14, are limited. Accordingly, in the initial position shown in FIG. 5, a minimum distance can be maintained between the stop surface 16c and the oppositely arranged end surface 14c of the closing element 14. Thus, during an opening movement of the closing element 14, there is initially no braking action until the closing element 14 comes into contact with the stop surface 16c of the stop body 16a via its end surface 14c of the guide interior 32. Upon further opening movement, the stop body 16a is then moved together with the closing element 14 in an opening direction along the axial direction L to cause compression of the catch spring 34 in the process. As a result of the compression of the catch spring 34, a gradual braking of the closing element 14 takes place. In particular, abrupt braking or abrupt striking of the closing element 14 against a fixed stop and wear on the components in question here, in particular on the closing element 14, can be avoided.

After reaching an end position in the opening direction of the closing element 14, the latter is moved again in the closing direction—directed upwards in FIG. 1. This closing movement is supported by the closing spring 15 and also by the relaxation of the catch spring 34, whereby the closing movement of the closing element 14 can only be supported by the relaxation of the catch spring 34 over a limited distance, in particular until the upper end position of the stop body 16a is reached, as shown in FIG. 5.

The stop body 16a may be made of a metal material or may be made of a plastic material. In the case of a plastic material, the stop body 16a may have damping properties. In particular, the stop body may be made of an elastomeric material or the like and thereby suitably dampen opening movements of the closure element 14 and thereby enable gradual braking in a particularly preferred manner with low wear. Furthermore, damping properties of the braking device 16 can be achieved by providing a damping element or a movement damper between the catch spring 34 and the stop body 16a or also between the catch spring 34 and the guide means 20. For example, the catch spring 34 can be mounted on a damping element which is arranged inside the guide means 20. Such a motion damper may, for example, be arranged as a damping plate 44 within the guide means 20 for supporting the catch spring 34. The damping plate 44 may be formed as part of or integral with the spring receptacle 35. In particular, the damping plate 44 may define a sleeve portion 45 of the spring receptacle 35.

As can be further seen from FIG. 5, the stop body 16a is equipped with an air passage 46 and the guide means 20 is also equipped with an air passage 48. Finally, the spring holder 35 or the damping plate 44 can also be provided with an air passage 50. The air passages of the individual components can be in fluid communication with each other. In this regard, the air passage 48 of the guide means may pass through the catcher 22. Due to the arrangement of the air passages, ventilation and/or venting of the guide interior 32 can be ensured during opening and/or closing movements of the closing element 14.

Figure 6:
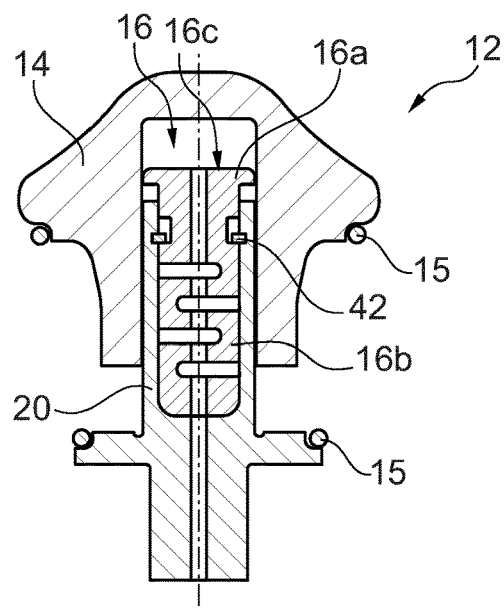
FIGS. 6 to 10 each a longitudinal section of further embodiments of a closing element.

FIG. 6 shows a further embodiment of a closing device 12 according to the invention. The closing device 12 according to FIG. 6 differs from the embodiment of FIG. 5 only in the design of the braking device 16. The stop body 16a is not supported by a separate catch spring relative to the guide means 20, but itself has an elastic portion 16b. The elastic portion 16b is formed by recesses 16e and thus enables compression or spring-elastic compression of the stop body 16a.

Figure 7:
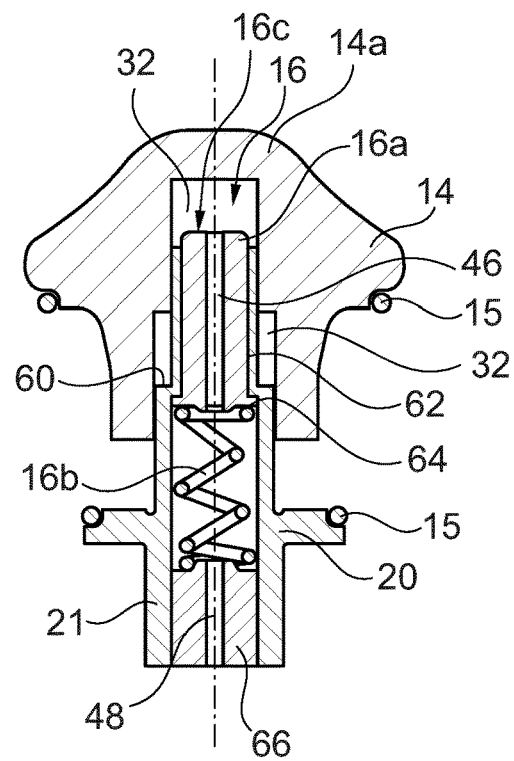

FIG. 7 shows a closing device 12 according to a further embodiment of the invention. The embodiment according to FIG. 7 differs from the embodiments according to FIGS. 5 to 6 in particular in the design of the guide means 20 and also with respect to the form-fitting engagement between the guide means 20 and the stop body 16a. Thus, the guide means 20 has a circumferential step 60 and thus sections of different outer diameter or outer circumference. Accordingly, the guide interior 32 also has sections of different inner diameter or inner circumference. In this case, an area of the guide interior 32 adjacent to the closing head 14a can be equipped with a smaller inner circumference or inner diameter, so that the closing head 14a has a greater material thickness and thus greater stability.

In the embodiment according to FIG. 7, the stop body 16a can be guided in particular in a guide section 62 of the guide means. A support collar 64 can be formed on the stop body 16a, which supports the stop body 16a in the region of the step 60 on the guide means 20, so that a movement of the stop body 16a in the direction of the closing element 14 is limited. A closing element 66 is further provided within the guide means 20, by which an inner space of the guide means is limited on a side facing away from the closing element 14. The air passage 48 of the guide means 20 may be formed within the termination element 66. A catch spring 16b may be arranged between the end element 66 and the stop body 16a, by means of which the stop body 16a is resiliently supported. In this embodiment, the catch spring 16b can also be a helical spring or the like.

Figure 8:
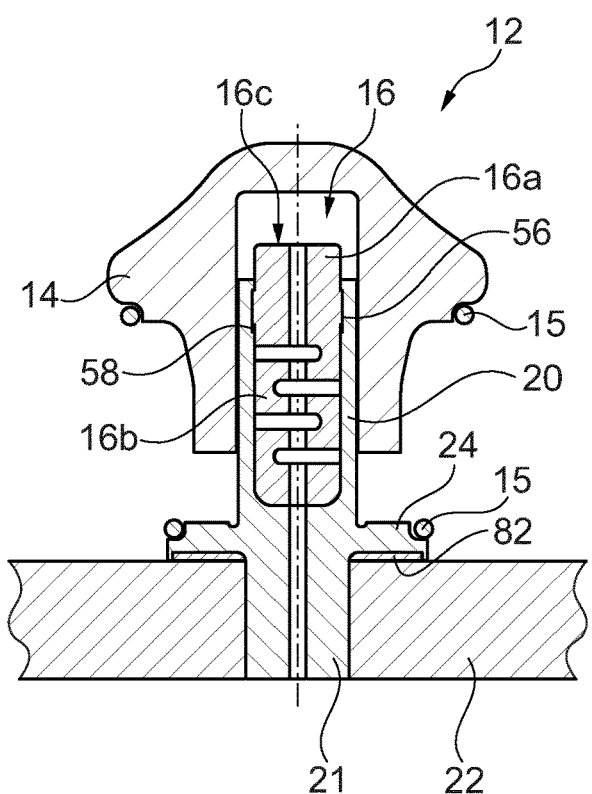

FIG. 8 shows a further embodiment of a closing device 12. The embodiment according to FIG. 8 differs from the embodiment of FIG. 5, among other things, by the type of form-fitting support of the stop body 16a relative to the guide means 20, as well as by the different elastic portion 16b. Instead of the snap ring 42, a protrusion 56 is provided on the outer circumferential surface of the stop body 16a in the embodiment according to FIG. 8. The protrusion 56 engages in a groove-like recess 58 of the guide means 20 and allows, to a predefined extent, a relative movement of the stop body 16a within the guide means 20 or a compression and relaxation to a predefined extent. In particular, the protrusion 56 may be implemented by increasing the diameter relative to adjacent portions of the stop body 16a. Furthermore, the recess 58 can engage behind the protrusion 56 in such a way that the stop surface 16c can be moved out of the receptacle of the guide means 20 and thus in the direction of the closing element 20 only up to a limited extent.

The embodiment according to FIG. 8 differs from the embodiment according to FIG. 6 in particular also in the type of support of the guide means 20 relative to the catcher 22. As in the embodiment according to FIG. 6, the guide means 20 is equipped with a collar-like support section 24, which, however, is supported on the catcher 22 via a wave spring 82. In this way, a spring-elastic support of the guide means 20 on the catcher 22 can be ensured and a gradual braking of the closing element 14 during opening movements can be further promoted. A fastening means not shown, for example a snap ring, may also be provided which prevents the fastening portion 21 from sliding out of the catcher 22, for example by the snap ring protruding radially beyond the fastening portion 21 and abutting the catcher 22.

Figure 9:
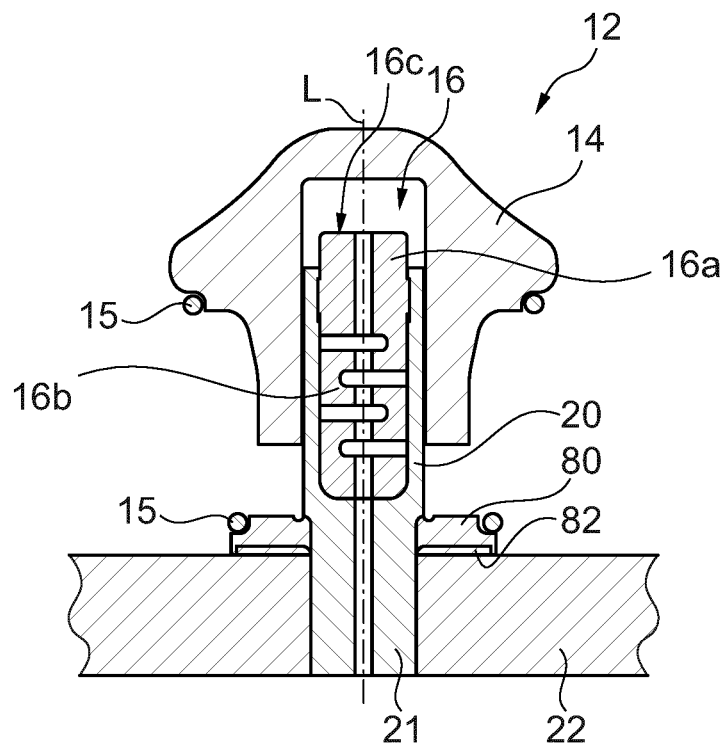

FIG. 9 shows a closing device 12 according to a still further embodiment of the present invention. The embodiment according to FIG. 9 differs from the embodiment according to FIG. 8 in particular in the design of the guide means 20 or its support on the catcher 22. Thus, according to FIG. 9, the guide means is supported on the catcher 22 via a separate damping plate 80. The damping plate 80 has spring-elastic properties and thus also contributes to the damping or gradual braking of the closing element 14 during opening movements. A wave spring 82 may further be provided between the damping plate 80 and the catcher 22, by which a spring-elastic support of the guide means 20 can be further improved.

Figure 10:
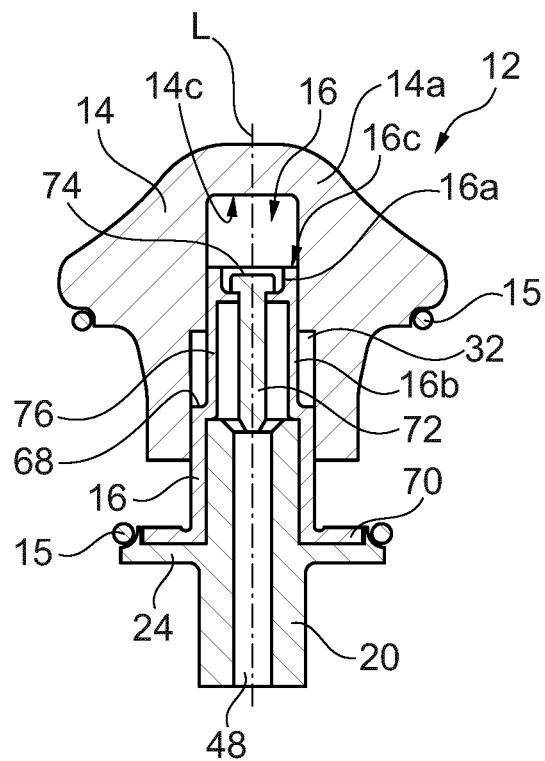

FIG. 10 shows a closing device 12 according to a still further embodiment of the present invention. The embodiment according to FIG. 10 differs from the embodiment according to FIG. 7 in the design of the guide means 20 and the braking device 16. In the embodiment according to FIG. 10, the braking device 16 is a sleeve-shaped element in which the guide means 20 is accommodated in sections. The braking device 16 thus forms part of the guide means 20, since the stop body 16a is guided directly within the guide interior 32 of the closing element 14. Furthermore, the guide means 20 is guided within the braking device 16, so that the guide means 20 indirectly guides the closing element 14 via the braking device 16. The braking device 16 comprises an elastic portion 16b, configured as a thin-walled hollow cylinder, for example in the form of a bellows, which has resilient properties. In particular, the braking device 16 is made of a metal such as bronze or a plastic such as PEAK. The guide means 20 is preferably made of steel.

As can be further seen from FIG. 10, the braking device 16 is provided with a step 68, so that the braking device 16 has sections with different outer diameters or outer circumferences. Accordingly, the guide interior 32 is also provided with different inner diameters or inner circumferences, with the region of the guide interior 32 adjacent to the closing head 14a being provided with a smaller inner diameter or inner circumference than the inlet region of the guide interior 32.

As can be further seen from FIG. 10, a collar portion 70 is further formed on the stop body 16a, which is supported on the support portion 24 of the guide means. A spring element or a damping element may be arranged between the collar section 70 and the support section 24. In particular, a wave spring may be arranged between the collar portion 70 and the support portion 24, for example a wave spring 82 as shown in FIG. 9, by which a relative movement between the stop body 16a and the guide means 20 is elastically supported. By means of such a wave spring, for example, a range of movement of a few 10ths of a mm, in particular of less than 1 mm, can be made possible.

According to FIG. 10, the guide means 20 may further be equipped with a retaining section 72. The retaining section 72 may be shaped in the manner of a nail and may have a head portion 74 for engaging firm-fittingly behind the stop body 16a. In particular, the head portion 74 may engage form-fittingly behind a collar portion 76 formed on an inner periphery of the stop body 16a, thereby limiting a movement of the stop body 16a toward an end face 14c of the closure member 14. The retaining section 72 of the guide means 20 may be fixedly connected to a sleeve portion 78 of the guide means, and lateral openings for fluid communication with the air passage 48 may be provided in a transition between the retaining means 72 and the sleeve portion 78.

Figure 11:
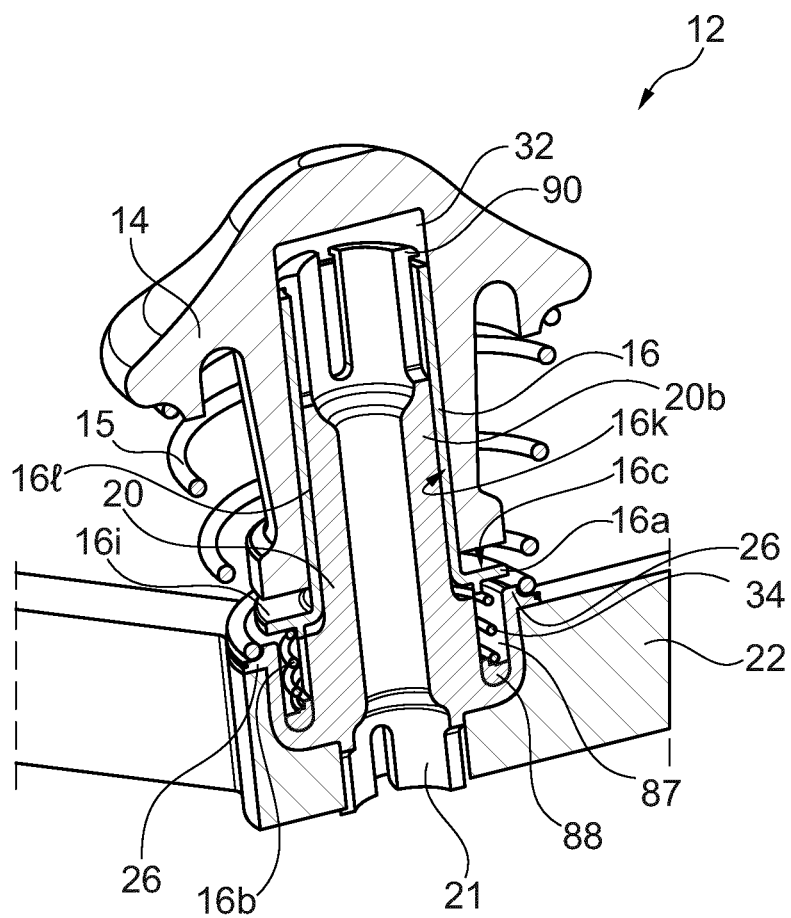
FIG. 11 a perspective longitudinal sectional view of a further embodiment of a closing element of the seat valve according to the invention.

FIG. 11 shows a perspective sectional view of a closing device 12 according to a still further embodiment. The embodiment according to FIG. 11 differs from the embodiments according to FIGS. 1 to 3 and 5 to 10 in the design of the brake device 16 and the guide means 20. According to FIG. 11, the brake device 16 has a sleeve-shaped section 16l and a stop body 16a projecting in the radial direction. The sleeve-shaped section 16l extends in sections within the guide interior 32 of the closing element 14 and encloses, at least in sections, the guide means 20. The guide means 20 has a sleeve-shaped portion 20b, the guide means 20 being disposed, at least in sections, within a recess 16k of the brake device 16. The stop body 16a is configured as a circumferential support collar 16i, which is arranged outside the guide interior 32. The support collar 16i is supported on the guide means 20 via an elastic portion 16b, designed as a catch spring 34, which is also arranged outside the guide interior 32. The catch spring 34 according to FIG. 11 can also be a helical spring or the like. The catch spring 34 can be arranged within a receptacle 87 of the guide means 20. The receptacle 87 can be annular or circumferential. Furthermore, a damping element 88 can be arranged within the receptacle 87, on which the catch spring 34 is supported, so that in addition to the spring properties, damping properties of the braking device 16 also result.

According to the embodiment in FIG. 11, the sleeve-shaped section 16l is engaged form-fittingly behind by a collar section 90 of the guide means 20, so that a relative movement of the sleeve-shaped section 16l in the direction of the closing element 14—i.e. in FIG. 11 corresponding to an upward movement—is limited.

FIG. 11 also shows that a bearing 26 for the closing spring 15 is formed on the guide means 20. The closing spring 15 thus acts between the bearing 26 of the guide means and the closing element 14.

The invention claimed is:

1. A seat valve comprising; a valve body having a plurality of inlet channels, with a plurality of closing elements arranged movably in a longitudinal direction L, each inlet channel being assigned a closing element for opening and closing the inlet channel, each closing element being assigned a closing spring which applies to the respective closing element a prestressing force oriented to close the inlet channel, each closing element being assigned a braking device which is arranged separately from the closing element and which gradually brakes an opening movement of the respective closing element when the inlet channel is opened, independently of the closing spring, wherein the braking device has a stop body with a stop surface against which the closing element can be brought to bear after an opening movement when the inlet channel is opened, the stop body being arranged such that it can at least one of move and yield in the opening direction of the closing element, wherein the braking device is guided along the longitudinal direction L by a guide means so that the stop body is arranged movably in the longitudinal direction L, wherein the guide means comprises a sleeve-shaped section, wherein a portion of the braking device is arranged within a recess of the sleeve-shaped section, and wherein the guide device for the closing element forms an inner guide along which the closing element is movably guided in the longitudinal direction L, and wherein the braking device has an air passage in the longitudinal direction L.

2. The seat valve according to claim 1, wherein the closing element is movably guided along the longitudinal direction L by the guide means, and wherein the closing element has a guide interior in which the guide means runs for guiding the closing element in the longitudinal direction L and wherein the guide means is connected to a catcher.

3. The seat valve according to claim 2, wherein said closing member comprises a closing head and a guide section, said closing head and said guide section following one after the other along said longitudinal direction L, and wherein the closing element, starting from the guide section, has the guide interior extending in the longitudinal direction L into the interior of the closing element in the direction of the closing head.

4. The seat valve according to claim 1, wherein the stop body is supported relative to the guide means via a catch spring.

5. The seat valve according to claim 4, wherein the catch spring is a helical spring.

6. The seat valve according to claim 1, wherein the stop body is made of an elastic material or has an elastic portion for elastically supporting the stop surface.

7. The seat valve according to claim 6, wherein the elastic portion is formed by at least one material recess.

8. The seat valve according to claim 1, wherein the closing spring surrounds the guide means as well as the closing element in axial direction L along a partial section from the outside, so that both the guide means and the closing element are arranged along this partial section within an inner space of the closing spring, the closing spring having an increasing diameter in the axial direction L towards the valve seat.

9. The seat valve according to claim 1, wherein the braking device is movable at least in sections in the longitudinal direction L.

10. The seat valve according to claim 1, wherein the braking device is yielding in sections in the longitudinal direction L.

11. The seat valve according to claim 1, wherein the closing element is movable in the longitudinal direction L, starting from a position $S_1$ closing the inlet channel, in an opening direction $L_O$ along a minimum distance $L_1$ relative to the braking device, and wherein the braking device is configured such that the closing element brakes only after the minimum distance $L_1$ covered, starting from the position $S_1$ closing the inlet channel.

12. The seat valve according to claim 1, wherein the stop body is arranged in a form-fitting manner in the guide means.

13. The seat valve according to claim 1, wherein the guide means has a second air passage, and wherein the air passage of the braking device is in fluid communication with the second air passage of the guide means, and that a third air passage leads through the catcher.

14. A piston compressor comprising a seat valve according to claim 1.

* * * * *